Patented Jan. 24, 1950

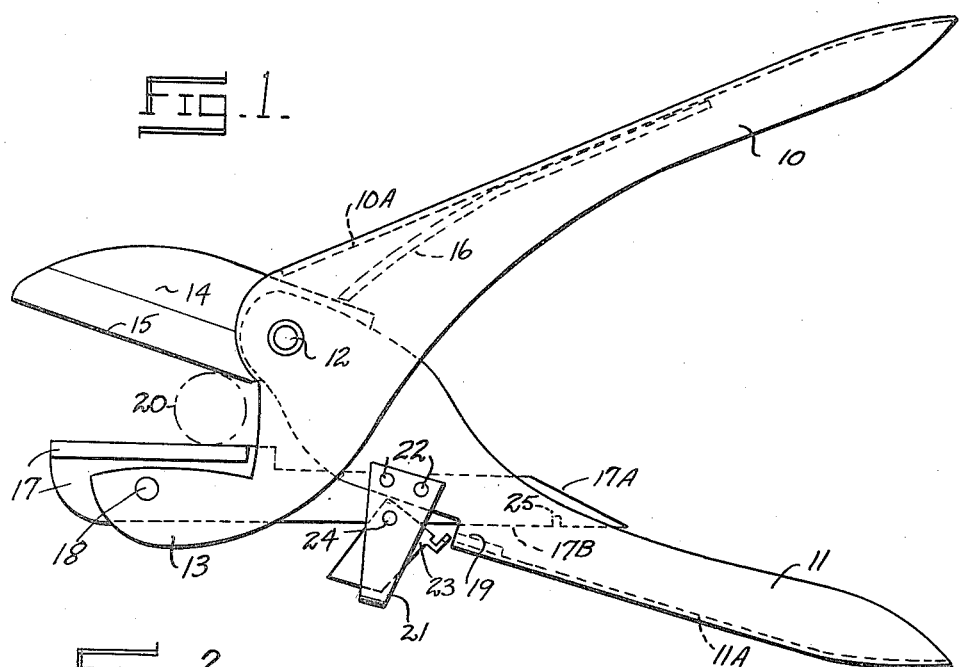
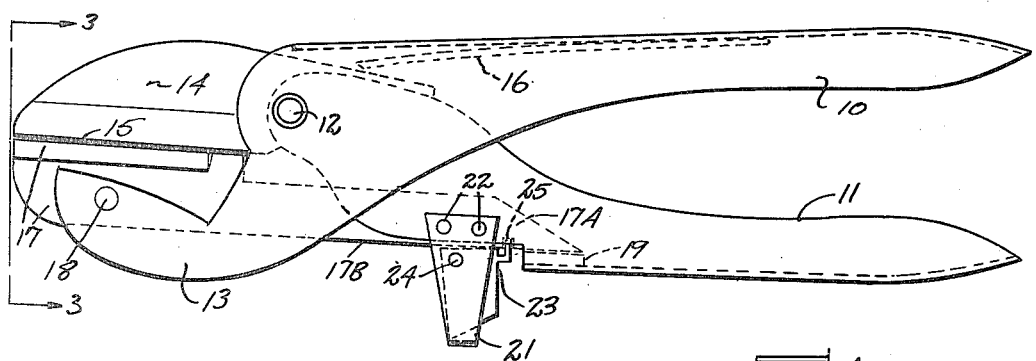
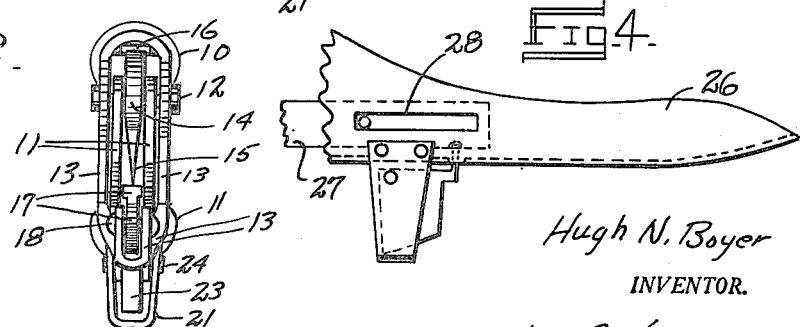
Hugh N. Boyer
INVENTOR.
BY W. B. Harpman
ATTORNEY

2,495,677

UNITED STATES PATENT OFFICE 2,495,677

PRUNING SHEARS

Hugh N. Boyer, Canfield, Ohio; Elizabeth M. Boyer executrix of said Hugh N. Boyer, deceased Application February 4, 1946, Serial No. 645,308

2 Claims. (Cl. 30—181)

This invention relates to a pruning shears.

The principal object of the invention is the provision of a pruning shears in which the cutting jaw members are maintained in parallel relationship when in closed position and in relatively widely spaced relationship when in open position.

A further object of the invention is the provision of means for holding the pruning shears in closed position.

A still further object of the invention is the provision of means normally urging the pruning shears into open position.

A still further object of the invention is the provision of a pruning shears incorporating an anvil jaw pivotally positioned in the pruning shears and motivated by the scissors-like action of the handles of the pruning shears.

The pruning shears shown and described herein has been devised to form a more efficient tool for pruning limbs of trees and shrubs and the like. The shears may be advantageously employed in trimming the larger branches which have heretofore been difficult to prune with tools of this type.

It is known in the art that many pruning shears have been devised and marketed which incorporated a conventional scissors action, the cutting blades opening and closing from parallel to V-shape location with respect to one another. The apex of the V-shape opening of the conventional pruning shears lies closest the pivot thereof and, therefore, at the point where the most leverage can be obtained. This formation forestalls cutting a relatively large branch positioned in the jaws near the pivot point.

The present invention relates to a device which permits a relatively large branch to be positioned in the jaws adjacent the pivot point.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a side elevation of the pruning shears in open position.

Figure 2 is a side elevation of the pruning shears in closed position.

Figure 3 is an end elevation of the pruning shears taken on line 3—3 of Figure 2.

Figure 4 is a fragmentary side elevation of a modification of the invention.

By referring to the drawings and Figure 1 in particular, it will be seen that the pruning shears includes a pair of handle members 10 and 11 pivoted to one another by a pivot 12. The lowermost portion of the handle 10 is formed in an extending jaw 13 while the uppermost portion of the lower handle 11 is provided with a knife extension 14. The cutting blade portion of the knife extension 14 is indicated by the numeral 15. The knife portion 14 is affixed to the upper end of the lower handle 11 by welding the same to the handle 11. Both the handle 10 and the handle 11 are preferably formed of sheet material folded upon themselves to form U-shaped constructions which are oppositely disposed with respect to one another in the pruning shears construction, as illustrated. Thus, the handle 10 is formed wider than the handle 11 so that the uppermost end of the handle 11 can be positioned within the bifurcated end section of the handle 10 and in turn carry the knife portion 14 between the bifurcated end of the handle 11. The folded lines where the handles 10 and 11 are formed are indicated by the numerals 10A and 11A.

It will be observed that dotted lines indicate the presence of a leaf spring 16, one end of which is affixed adjacent the fold line of the handle 10 and the other end of which is free and engages the rearmost portion of the knife member 14 thus tending to force the handle 10 upwardly and away from the handle 11 to which the knife member 14 is affixed.

Still referring to Figure 1 of the drawings, it will be observed that an anvil jaw 17 is pivoted by a pivot 18 between the bifurcated lower end section of the upper handle 10 and that a bar-like extension 17A of the anvil jaw 17 extends backwardly between the bifurcated portion of the lower handle 11 and lies therein in a manner so that its lowermost edge 17B slidably engages the upper and innermost edge 19 of the fold line portion 11A of the lower handle 11. Thus, the anvil jaw 17 and the bar-like extension 17A thereof form, in effect, a lever pivoted on the pivot 18, the lever being moved by the sliding engagement of the lower edge 17B thereof with the portion 19 of the lower handle 11. The result of this construction is that when the pruning shears is closed, as in a cutting or pruning operation as may be seen by referring to Figure 2 of the drawings, the moving together of the handles 10 and 11 raises the bar-like extension 17A of the anvil jaw 17 and thereby pivots the anvil jaw 17 on the pivot 18 and brings it into parallel relation with the cutting blade 15 of the knife portion 14.

By referring to Figures 1 and 2 of the drawings, it will be observed that when a limb such as indicated by the broken lines 20 in Figure 1 is positioned in the cutting jaws of the pruning shears it is very close to the pivot 12 and thus considerable leverage may be brought to bear thereon which more easily and quickly cuts the limb. When the jaws are fully closed they will be in completely closed relationship as shown in Figure 2 by reason of the action of the bar-like extension 17 sliding along the handle 11 and being raised thereby with respect to the handle 10 when the pruning shears are closed.

In order that the pruning shears may be maintained in closed position, as shown in Figures 2 and 3 of the drawings, a finger guard and latch combination are provided, the guard being indicated by the numeral 21 and formed as a loop-like member attached at its uppermost ends by rivets 22 to the bifurcated end section of the lower handle 11. A latch 23 is pivoted by a pivot 24 in the finger guard 21 and an upwardly extending portion thereof engages a keeper 25 in the bottom surface 17B of the bar-like extension 17A of the anvil jaw 17.

It will be seen that when the pruning shears is grasped by the hand of the user, the fingers will be positioned beneath the lower handle 11 and the forefinger will come into position against the latch 23 and may be used to move it into unlatched position with respect to the keeper 25 thereby freeing the pruning shears from locked position. The latch 23 will move into the finger guard 21, as shown in Figure 1, and it then serves as a means of preventing the fingers from moving too far forward into position where they might be pinched.

It will be obvious to those skilled in the art that modifications in the construction disclosed may be made and particularly with respect to the motion applied to the pivoted anvil jaw 17 heretofore disclosed.

In Figure 4 of the drawings an alternate arrangement is disclosed for applying motion to the jaw construction. In Figure 4 the lower handle of a pruning shears is indicated by the numeral 26 and the rearwardly extending portion of a pivoted jaw, comparable to the anvil jaw 17 heretofore disclosed, is indicated by the numeral 27. A slot 28 is formed longitudinally of the handle 26 and a pin 29 positioned transversely in the pivoted jaw extension 27 is engaged in the slot 28 so that movement of the handle 26, like the movement of the handle 11 in the disclosure of Figures 1, 2 and 3, will cause the pivoted jaw extension 27 to rise by reason of the pin 29 slidably engaging the slot 28 and moving to the left therein as shown in Figure 4 when the pruning shears, including the modification, are closed.

It will thus be seen that the construction shown is relatively simple in formation and thereby capable of being economically produced. The pruning shears are extremely advantageous in operation in that the relatively wide mouth positioning of the jaws, when open, enables them to receive a relatively large branch to be pruned at a location between the jaws very close to the pivot 12 thus enhancing the leverage obtained when the handles are moved together.

Having thus described my invention, what I claim is:

1. In a pruning shears, a first lever having a hand grip portion and an off-set end portion comprising a pair of spaced parallel flanges, a blade member rigidly secured between the outer end portions of said flanges, a second lever pivotally connected to the outer end portion of said flanges and having a hand grip portion extending to one side of the point of pivotal interconnection and an off-set portion on the other side of said point of pivotal interconnection, an elongated anvil member slidably received between said flanges inwardly of said blade member, and a pivotal interconnection between the outer end portion of said anvil member and the outer end portion of said off-set portion of said second lever whereby when said blade and anvil members are brought together upon movement of the hand grip portions of said levers toward each other the anvil member is moved into line contact with said blade member.

2. In a pruning shears including crossed and pivoted handle members one of which is provided with a knife blade and the other of which is provided with a secondary pivoted jaw, means for moving the pivoted jaw, said means comprising a rearwardly extending portion of the pivoted jaw slidably engaging the other one of the said handles, and means for holding a pruning shears in closed position, said means including a finger guard positioned on the said handle slidably receiving the rearwardly extending portion of the pivoted jaw, a keeper formed in the said rearwardly extending portion of the pivoted jaw, a latch pivoted to said finger guard and a portion of the said latch adapted to register with the said keeper.

HUGH N. BOYER.

REFERENCES CITED

The following references are of record in the file of this patent:

UNITED STATES PATENTS

| Number | Name | Date |
|---|---|---|
| 1,214,635 | Zimmerman | Feb. 6, 1917 |
| 1,963,564 | Smith | June 19, 1934 |
| 2,207,994 | Trapp | July 16, 1940 |
| 2,295,385 | Conners | Sept. 8, 1942 |